July 19, 1966 E. W. MILLER 3,262,097

DEAD TRACK HANDLING

Filed Dec. 31, 1962 2 Sheets-Sheet 1

INVENTOR
EARL W. MILLER

BY Carl C. Kling

ATTORNEY

United States Patent Office 3,262,097
Patented July 19, 1966

3,262,097

DEAD TRACK HANDLING

Earl W. Miller, Poughkeepsie, N.Y., assignor to International Business Machines Corporation, New York, N.Y., a corporation of New York Filed Dec. 31, 1962, Ser. No. 248,352
7 Claims. (Cl. 340—146.1)

This invention relates to digital record reading, and more particularly to mechanism and method for eliminating the secondary effects of a dead track on a record which effects might otherwise interfere with electronic deskewing and error correcting mechanisms.

The use of electronic deskewing and error correction with certain types of recording schemes requires that each recording track provide signals according to the format of a "binary erasure channel." In the binary erasure channel, proper signals may be either 1 or 0, but improper signals are always (E) (error). It is contrary to the definition for a 1 to change to a 0 or for a 0 to change to a 1. After a defect in the recording medium or in the reading circuits causes the track signal to go dead temporarily, there is a possibility that the binary erasure channel characteristics of the track will be lost when the track signal reappears, because of loss of synchronization. So long as there is awareness that the track has lost its binary erasure channel properties, mechanical or mental provision can be made to discount or correct the data from the dead track. Dead track mechanism according to this invention helps make such provision.

ENVIRONMENT OF THE INVENTION

The invention operates most effectively in the environment of a multi-track magnetic tape system in which a reading group (byte) of binary information bits disposed in a row across the tape are read more or less out of synchronism and are assembled (placed in synchronism) by electronic deskewing apparatus. The 1 and 0 bits in a particular track are distinguishable from one another by their time-phase relationship and from the "no-information" state or "dead track" by amplitude.

*Variable frequency clock*

Each track is scanned by reading mechanism provided with a variable frequency clock (VFC) which is continuously corrected by the bit signals themselves to provide clock timings for further bits in the track. Because of close bit packing, the VFC on one track might in normal operation be one-half or several bits ahead of the VFC of another track. The VFC can operate only for a small number of bit intervals during a dead track condition before the lack of correction makes its timings unreliable. The momentary occurrence of a dead track might cause a series of errors as the track again becomes "live," by the VFC's homing in one-half to several bits early or late. Such a series of errors would result as the electronic deskewing apparatus assembles bytes in which the bit from the resurrected track comes from an earlier or later byte than the bits from the other tracks, or from confusing the 1 with the 0 by sampling on a wrong time base such as at half after bit times.

*Binary erasure channel error correction*

The magnetic tape system in which the invention finds its greatest utility provides outputs at the reading mechanism which correspond to what code mathematicians call a binary erasure channel. In such a binary erasure channel (BEC) the only acceptable data values are 0 and 1. The characteristics of the BEC, however, are such that, in spite of maximum error, no 0 can change to 1 and no 1 can change to 0. There are effectively three basic values, 0–(error)–1. A lost 0 will become (error) and a lost 1 will become (error).

There are several available error correction schemes for bytes appearing on binary erasure channels. One or more parity channels are provided in addition to the data channels.

Parity groups are set up in one such error correction scheme so that the error channel in the group of channels can be identified. The error bit thus identified is set to the value which provides the parity value required by the rest of the channels.

It is imperative in BEC error correction schemes that the binary values 1 and 0 *never* change as a result of error to anything but (error). Such a change (for example from 1 to 0) would make the error channel indistinguishable from the OK channels and destroy error correction capability.

So long as the bit signals from the tape reading mechanism maintain the characteristics of the binary erasure channel, relatively simple error correction mechanism can maintain the quality of the data by supplying the correct value of the (error) bits, so long as the number of (error) bits in each byte do not exceed the correction capability of the error correction mechanism. This capability is related to the number of channels devoted to parity rather than data.

*Electronic deskewing mechanism*

Error correction schemes recognize that errors are likely to occur in bursts. One common type of burst is the dead track, in which several successive bits in a single track are (error) bits. Since the electronic deskewing mechanism generally assembles a byte by delaying bits from the leading channels until the bit from the lagging channel arrives, whole bytes can be lost if the dead track bits are not supplied or their absence provided for. For example, in a three track system having four bytes of electronic deskewing, the situation might be as follows:

Track 1: 1″ 0″ / 1′ 1′ 0′ 1′ / (0) (1)
Track 2: 1″ / 0′ 0′ 0′ 1′ / (1) (0)
Track 3: – / – – – – / (1) (1)

The primed bits enclosed within the slashes are retained in the electronic deskewing mechanism (skew buffer) awaiting arrival of the appropriate bits from track 3. If the track 3 bits do not occur, the double-primed bits replace the primed bits in the skew buffer and the primed bits can no longer be assembled into correct bytes. If, however, the track 3 bits are known to be lost, and not merely lagging, the bytes may be assembled with (error) bits, and passed to error correction mechanism to be repaired. In the above example, the situation can be saved by the insertion of (E) bits as follows:

Track 1: 1″ 0″ / 1′ 1′ 0′ 1′ / (0) (1)
Track 2: 1″ / 0′ 0′ 0′ 1′ / (1) (0)
Track 3: / (E) (E) (E) (E) / (1) (1)

The (error) value is not necessarily in the form of (E) bits. It can be a continuous signal if the electronic deskewing mechanism and error correction mechanism are set up to respond properly. The favored response to the (error) signal is for the electronic deskewing mechanism and the error correction mechanism to ignore the error channel (dead track) and proceed as if this channel did not exist on the tape. The error correction mechanism of course supplies a proper bit value for each of the missing bits resulting from such ignoring of the error channel.

CHARACTERISTICS OF THE INVENTION

The basic object of the invention is to maintain the characteristics of the binary erasure channel in spite of a temporary dead track on the recording medium.

*Objects*

A particular object of the invention is to identify dead tracks on a recording medium and to provide compensation for the adverse effects of the dead track in data assembly.

A more particular object of the invention is to identify dead tracks on a recording medium, defining the dead track as a track in which data bits are below standard for longer than a standard duration, and to provide separately compensation for the adverse effects of the dead track and for temporary lapses of signal quality not amounting to a dead track.

*Features*

A feature of the invention is the provision, for each channel, of a dead track latch which signals (error) to electronic deskewing mechanism and to any error correction mechanism, allowing those mechanisms effectively to ignore the dead track during the set condition of the dead track latch.

Another feature of the invention is the provision, for each channel, of a dead track latch which signals (error) to electronic deskewing mechanism and to any error correction mechanism, together with timing mechanism which checks the duration of a period of substandard data bits signals against a standard time duration, makes temporary provision for (error) signals during the standard time duration and sets the dead track latch for a semipermanent (error) signal after the running of the standard time duration.

Another feature of the invention is the method of identifying, defining and compensating for a dead track.

*Advantages*

The provision for the dead track (error) signal maintains the data in the form of a binary symmetrical channel, thus maintaining the data in a form which is subject to error correction by simple means.

The provision of the dead track (error) signal allows the electronic deskewing mechanism to ignore the dead track bits as it assembles data bytes, thus preventing overflowing the capacity of the skew buffer and consequent possible loss of data by overlong waiting for lagging bits.

Definition of the dead track and provision of the dead track (error) signal prevents the variable frequency clock for a channel from locking onto signals one-half or more bits out of synchronization, which would destroy the quality of the data.

The foregoing and other objects, features and advantages of the invention will be apparent from the following more particular description of preferred embodiments of the invention, as illustrated in the accompanying drawings.

*Summary—See FIGURE 1*

The invention relates to identification of the dead track condition on a multi-track recording medium and compensation for secondary effects which the dead track condition might otherwise cause. Serially presented data bits developed from the several tracks of the recording medium are presented more or less in sychronism along the several channels (channels 1 and *n* shown) to envelope detectors 10 and 16. Each envelope detector responds to a failure of a continuously alternating signal during record reading (signal RECORD GATE) to supply a setting signal to its respective dead track latch 13 or 19. Envelope detector 10, for example, upon failure of its input signal to alternate beyond the standard signal levels, provides a setting signal to dead track latch 13. The dead track latch provides a continuous (error) signal to electronic deskewing mechanism 14 and to error correction mechanism 15 until reset at end of record by signal END OF RECORD RESET. Variable frequency clocks for each channel (11 and 17 shown) define the incoming bits for their respective channels and respond to the bits by correcting their timings according to the presentation of the bits. Since during loss of bits, the VFC may drift out of time, seriously affecting the deskew and error correct mechanisms, the (error) signal provided by the dead track latch allows the deskew blocks and the error correct logic block to ignore the data bits presented on the dead track during the remainder of the record.

*Drawings*

METHOD

The method of handling the dead track situation requires for each channel, the concurrent steps of:

(1) Identifying the existence of a subminimal signal;

(2) Defining as the dead track any channel which exceeds on a time base a threshold of non-permissibility during a data interval; and (3) Providing an error signal which can be used to compensate for the data bits normally presented by the track.

Step 2 may be simply handled by establishing the threshold at the level of instantaneous falling below a standard amplitude level, or may be handled by establishing the threshold at a standard duration measured by a timing device.

FIGURE 1.—DEAD TRACK ELIMINATION

The circuit defines a dead track and eliminates it from further consideration during the record. A dead track latch is set immediately upon definition as a dead track by a temporary signal failure during a record. The dead track latch thereafter provides a continuous ERROR signal which eliminates the dead track from further consideration. This elimination operates on the assumption that the VFC may have drifted off synchronization, so that any further live data bits in the track are so suspect that it is more advantageous to treat the track as dead until the end of the record.

Reader 9 provides phase encoded data on the several channels.

*Subminimal signal identification*

Figure 3:
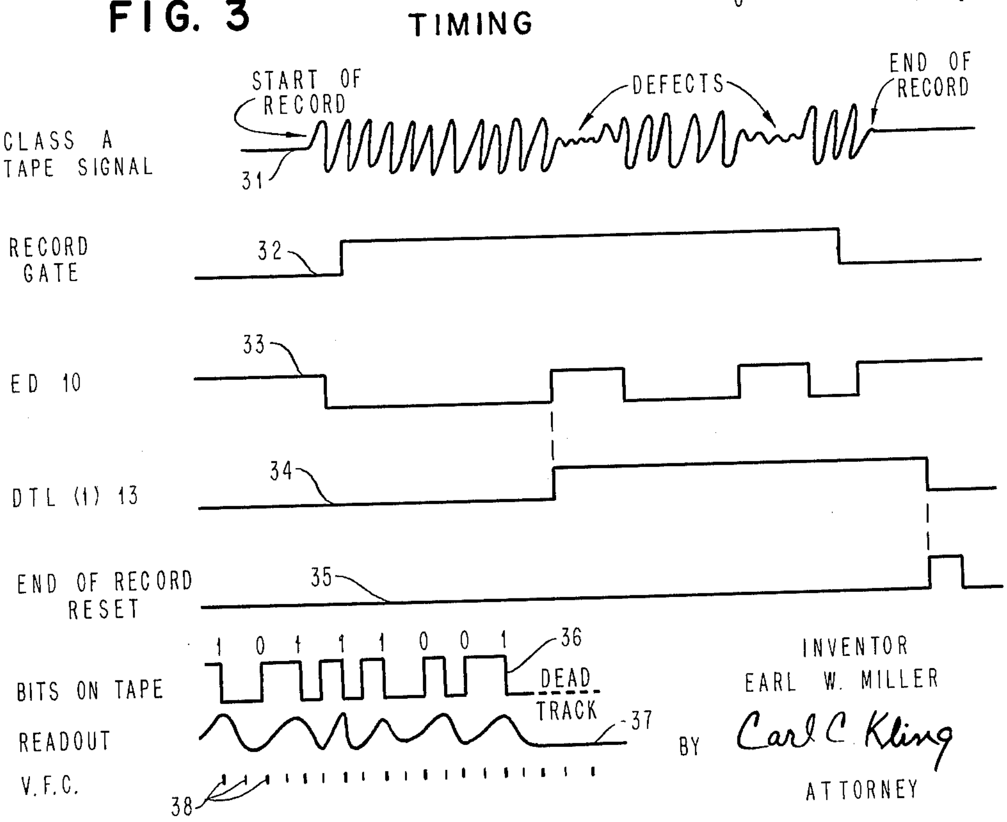
FIGURE 3 is a timing diagram for the embodiment of FIGURE 1.

In channel 1, envelope detector 10 responds to the continuous application of proper amplitude alternating signals to its input by providing a continuous down condition at its output. Variable frequency clock 11 corrects its timings according to the input signal. In FIGURE 3, line 31 shows the characteristics of the signal after start of record; line 33 shows the response of the envelope detector. When the signal falls below acceptable levels as a result of a defect in the reader or in the tape, envelope detector 10 responds with its up level, which is a (subminimal signal identification) signal.

*Dead track definition*

If the signal defect occurs during a record, the signal RECORD GATE (see line 32 in FIGURE 3) is up and AND block 12 passes the up level of the envelope detector 10 forward as the (dead track definition) signal.

*Dead track error signal production*

The (dead track definition) signal passes to the set input of dead track latch DTL(1)13. The dead track latch remains set until the end of record at which time it is reset by a signal END OF RECORD RESET (see lines 35 and 37 in FIGURE 3), regardless of whether or not another defect in tape signal should occur. The dead track latch provides a continuous (error) signal to deskew block 14 and to error correct block 15. Conventional data flow paths from reader 9 to deskew box 14 and error correct logic box 15 are not shown.

FIGURE 2.—BINARY ERASURE CHANNEL

In a binary erasure channel the 1 bit value input can result only in the 1 bit value output or the (error) output as shown by the arrows. It cannot ever result in the 0 output indicated by the broken line arrow.

Similarly, the 0 bit value input can result only in the 0 bit value output or the (error) output as shown by the arrows. The 0 value input can never result in the 1 value output indicated by the broken line arrow.

It will be shown under "Timing" below how a dead track can destroy the binary erasure channel relationship unless proper measures are taken.

FIGURE 3.—TIMING

The tape signal applied to a representative dead track elimination circuit such as that previously explained for channel 1 (items 10, 12, 13 in FIGURE 1) might be shown by line 31.

The start of record is defined by some characteristic sequence of gaps, bits or characters which is detected by mechanism not a part of this invention. After the start of record, a record gate is continuously up during the record. Line 32 shows this result. During the initial sequence of proper bits in the record track (see line 31) envelope detector 10 provides a continuous down condition in response to the proper envelope of the record track. Upon occurrence of a defect in the record (middle of line 31) the envelope detector signal comes up. The positive-going excursion of the envelope detector 10 output provides a setting signal for dead track latch 13 which thereafter provides a continuous up condition as shown in line 34. The dead track latch maintains the up condition until reset by the end of record reset as shown on line 35, in spite of the reoccurrence of proper signal envelope (see line 31) and the resulting downward excursion of the envelope detector signal on line 33.

Lines 36, 37 and 38 indicate the operation of a tape track on a left to right time basis with a dead track appearing last. Bits on tape are recorded as sharply defined areas of magnetization. The 1 bit is defined as a change from the positive to negative phase at bit time as shown by a downward slope (corner) on track 36; the 0 bit is defined as a transition from the negative phase to the positive phase as indicated by an upward slope (corner) of the line 36. Line 37 shows the readout signal equivalent to the bits on tape shown in line 36. Line 38 shows the variable frequency clock which follows and defines the readout signal of line 37 to be indicative of the bit values of line 36. The VFC operates at twice the frequency of the bits; it provides electrically indistinguishable "bit" and "half after bit" pulses which are shown differently in line 38 for clarity. Where there is a sequence of same bits such as the 111 sequence in line 36, it is necessary for the VFC to be exactly in synchronism. After the first 1 has been recorded as a transition corner from positive to negative phase, it is necessary for there to be a transition from negative to positive phase to prepare for the following 1 which must also be a transition corner from positive to negative phase. If the VFC should be 1 beat (one-half bit) out of synchronism, the row of 1's would look exactly like a row of 0's since the VFC would cause reading at half after bit times. The transition corner from negative to positive, which is merely housekeeping for the following 1 bit, would be read as a 0. The binary erasure channel characteristic would be lost. A 00 sequence similarly requires a phase transition corner at half after bit time to prepare for the following 0 which is a transition corner from negative to positive phase.

When a dead track occurs as at the end of line 36, the read out signal fades to nothing as shown by the flat portion of line 37 and the VFC operates for a time without correction. Line 38 shows how the VFC may drift without this correction in such manner that it might be one-half or several bits off synchronism when the data reappears on the dead track. In such situations, the data being read would not be trustworthy. The binary erasure channel characteristic can possibly be lost.

*Summary—Dead track elimination*

Since data is sampled according to the VFC which is corrected by the data itself and since data is defined as polarized phase changes occurring at a VFC timing and since polarized phase changes may occur at half after bit times and thus be erroneously detected as bits, it is necessary for the VFC to be exactly in synchronism with the incoming phase changes for the changes to be detected as bits. A defect in tape reading which might cause the VFC to lose synchronism thus can, by allowing the VFC to get out of synchronism, allow erroneous timing situations to destroy the binary erasure channel characteristic of the track upon which error correction mechanisms depend, by allowing a 1 to be erroneously read as a 0 or vice versa. The envelope detector identifies such a defect in record reading signal and causes setting of the dead track latch which effectively removes the rest of the bits in the particular track from the record. Error correction mechanism is expected to be able to handle this situation since it is a simple error and the binary erasure channel relationship is maintained. At end of record the dead track latch is reset and the following record is handled normally.

FIGURE 4.—DEAD TRACK DEFINITION

Figures 4, 5:
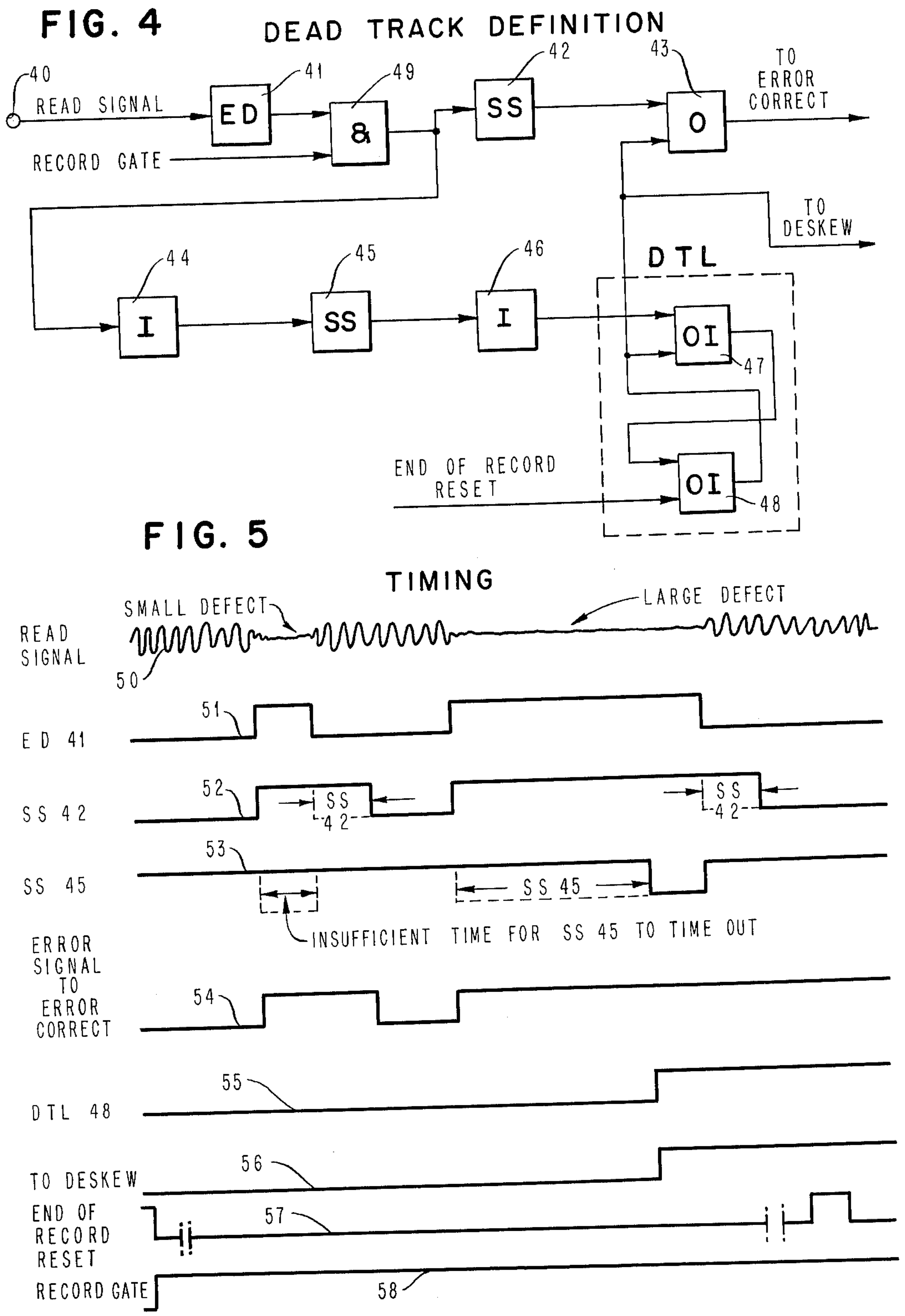
FIGURE 4 is a block diagram of a second embodiment of the invention in which a dead track is defined as a series of substandard bit signals exceeding a standard time duration, and dead track elimination is carried out on a more sophisticated level.
FIGURE 5 is a timing diagram for the embodiment of FIGURE 4.

Since it is possible for the VFC to retain synchronism over a small number of bit periods, it is not always necessary to (error) out the remainder of the record. A series of, for example, ten error bits might be permissible. This circuit defines dead tracks as tracks in which an error longer than a permissible major duration occurs. FIGURE 4 shows only a single track since the general operation is identical to that of FIGURE 1.

*Subminimal signal identification*

Figures 1, 2:
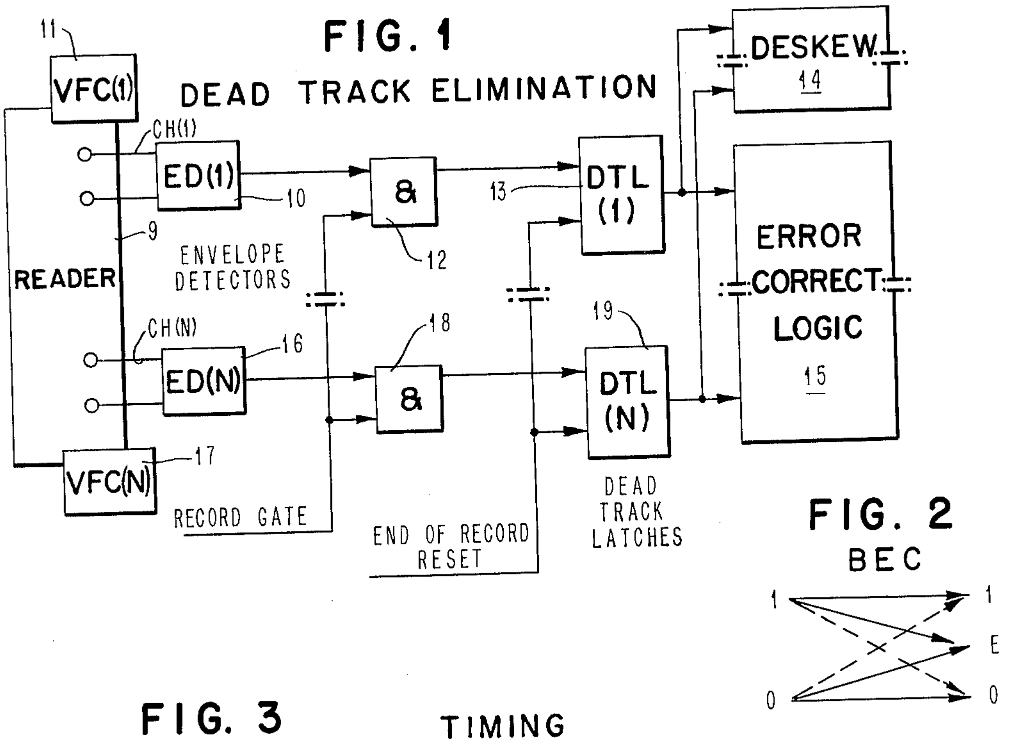
FIGURE 1 is a block diagram of a first embodiment of the invention in which dead track elimination is provided.
FIGURE 2 is a diagram for explaining the characteristics of a binary erasure channel.

The read signal impressed at terminal 40 passes through envelope detector 41 through minor duration holdover single shot 42 and output OR block 43 to error correct logic box 15 (FIGURE 1). Minor single shot 42 extends the error signal by its period beyond the actual defect upon the assumption that a further defect will occur as a part of the tail of the current defect. Minor single shot 42 thus causes the track to appear to error correct logic box 15 as in error for a period of time considered necessary to establish reliability of further data bits in the track. AND block 49 ensures that the dead track definition requires that the track be in a data condition, as indicated by signal RECORD GATE. The skew buffer clears during single shot 42 holdover.

*Dead track definition*

Envelope detector 41 also connects via inverter 44, and major duration holdover single shot 45 to inverter 46 to provide a time delay. If the applied dead track identification signal extends beyond the time delay, single shot 45 provides a dead track definition signal.

*Dead track error signal producing*

Inverter 46 provides the dead track definition signal via OR block 47 of the dead track latch to output OR block 43, and thus to the error correct logic as the error signal. Dead track latch OR block 47 connects directly to the deskew logic. The dead track latch also contains AND block 48 which responds to the end of record reset.

FIGURE 5.—TIMING

Lines 50–57 show the timings for dead track definition circuits shown in FIGURE 4. Line 50 shows a read signal with a small defect and a large defect occurring in that order in time. Line 51 shows the output of envelope detector 41 which provides a positive signal during occurrence of the small defect and during occurrence of the large defect in the read signal of line 50. Line 52 shows the output of minor single shot 42 which extends the output of envelope detector 41 (see line 51) by its period both after the small defect and after the large defect. Line 53 shows the output of major single shot 45 which because of inverter 44 is oppositely polarized to that of minor single shot 42. The output of major single shot 45 remains up during the small defect because there is insufficient time for single shot 45 to time out. During the large defect, however, single shot 45 does time out and thereafter provides a negative output during the remainder of the large defect.

Line 54 shows the output of the error signal connection to error correct logic box 15 of FIGURE 1. This error output is the sum of the outputs of minor single shot 42 and of dead track latch 47–48. Note that an error signal is provided during a small defect but that normal operation may be resumed. During and after a large defect, however, the dead track error signal is provided continuously.

Line 55 shows the output of the dead track latch; line 56 shows the signal sent to the electronic deskew mechanism. Since during a small defect there is by definition no likelihood of VFC off-synchronization, there is no signal presented to deskew box 14 of FIGURE 1 during the small defect nor during the early portion of the large defect. No signal is sent to the deskew logic until the setting of the dead track latch after single shot 45 times out during the large defect. By this time it has been ascertained that the VFC timings are no longer trustworthy and that the deskew logic should ignore the dead track for the remainder of the record.

Line 57 shows the end of record reset signal. This signal is a positive pulse which falls and remains negative during the entire record.

Line 58 shows the record gate signal which is positive during data times.

*Summary—Dead track definition*

A recording track on the recording medium may produce a small signal defect which is not significant enough to cause drifting of the VFC. In such a small signal defect situation, it is preferred to resume normal reading of the data bits from the track at termination of the defect, but to provide an error signal during the existence and early postexistence of the defect. A minor duration holdover single shot extends the error signal during the early postexistence. Upon occurrence of a large signal defect, however, there is a possibility that the VFC will drift, thereby destroying the binary erasure channel characteristic. It then becomes necessary to provide a continuous error signal for the remainder of the record. A major duration holdover single shot and dead track latch combine to define an envelope defect of major scope and provide a continuous error signal thereafter for the duration of the record.

MODIFICATIONS

The invention is described in the environment of a phase encoded recording system. The dead track handling method and mechanism will also work in the environment of a frequency modulation system.

The use of variable frequency clocks is common to most high quality record readers in current use. Generally, each channel has its own variable frequency clock. Other timing methods are feasible, however. One variable frequency clock may service several adjacent channels, for example. It is also possible to take timings from the bit signals or from special timing bits on the recording medium.

SUBASSEMBLIES AND COMPONENTS

*Reader 9*

U.S. Patent Number 3,217,183, issued November 9, 1965, Binary Data Detection System, Brunschweiger (application Serial Number 249, 529, filed January 4, 1963). IBM Docket Number 7606, describes a suitable reader for phase modulated signals presented serially by track on a recording medium.

*Variable frequency clock 11*

The relationship between the variable frequency clock and the data sensing mechanism is explained in the Brunschweiger patent application identified above, and in Patent No. 3,197,739 by E. G. Newman, filed on June 30, 1958.

Details of the variable frequency clock per se are explained in U.S. Patent Number 3,156,875, issued March 10, 1965, B. C. Fiorino and A. Brunschweiger, Variable Frequency Sawtooth Generator (application Serial Number 117,176, filed June 14, 1961). IBM Docket Number 7502.

*Subminimal signal identification means*

Envelope detector 10 may be any of a large family of circuits which convert the waveform shown as line 31 with the waveform shown in line 33. An example of such an envelope detector is:

U.S. Patent Number 3,002,154, issued September 26, 1961, Schmitz et al., Pulse Amplitude Detection System.

*Dead track definition means*

Single shot 42 is a holdover single shot of minor duration. Single shot 45 is a holdover single shot of major duration. These two single shots may be any of a large family of available single shots connected in holdover fashion to extend the input pulse by a standard duration.

Examples of suitable single shots are:

Belcastro, "Single Shot Multivibrator," IBM Technical Disclosure Bulletin, volume 3, No. 3, August 1960, pages 39–41.

Smith, "Overlap Method in Transistor Circuits," Electronic Design, May 28, 1958, pages 44, 45, 47.

*Error signal producing means*

The dead track latches may be any of a large family of triggers or latches of the set-reset type. Details of one such latch are shown at OI block 47 and OI block 48 with suitable interconnections. The OR blocks making up the latch are of the inverting type, and may be identical NOR circuits. The output of the OI, OR and Inverter circuits may be any of a large family of logic blocks. As shown, some are of the inverting type and may be implemented as identical NOR circuits. The others may be simple diode circuits.

*Electronic deskewing means 14*

U.S. Patent Number 2,921,296, issued January 12, 1960, Theodore G. Floros, Deskewing System (Serial Number 745,501, filed June 30, 1958) IBM, discloses electronic deskewing mechanism.

*Error correct logic 15*

U.S. Patent Number 3,144,635, issued August 11, 1964, Error Correcting System, David T. Brown and Paul W. Woo (application Serial Number 159,282, filed December 14, 1961). IBM Docket Number 7562, describes suitable error correct logic, together with its relationship to the system. The dead track error signal cooperates with or replaces the threshold circuits (25) of the Brown & Woo application. A dead track error signal indicates to the error correction circuits (30–37) that the currently expected bit of the channel is unreliable (forces a below-threshold).

A college textbook, Peterson, Error-Correcting Codes, MIT Press-Wiley & Sons, New York, 1961, contains a helpful analysis of binary erasure channel operation (at page 6) and several chapters dealing with suitable types of error correction codes. Peterson also includes a bibliography of 129 references.

FINAL SUMMARY OF INVENTION

The current existence of a signal defect in a channel signal is identified by dead track identification means including for the channel (for example channel 1) an envelope detector 10 which responds to the signal input to provide an identification signal when the signal envelope is subminimal.

The dead track identification signal may be used directly as a full definition of the dead track situation, as in FIGURE 1. In this embodiment the dead track identification signal is also the dead track definition signal, so long as it occurs within a record.

Dead track definition may be further refined by dead track definition circuits including one or more single shot devices to measure the duration of the dead track identification signal against a standard duration and thus provide a dead track definition signal only when the duration of the subminimal envelope is longer than the permissible standard duration. Normal reading for the channel may thus be resumed after a minor duration signal defect, reserving dead track operation for signal defects of major duration.

Error signal production in response to the identification and definition of the dead track situation provides the necessary error signal to preserve the characteristics of the binary erasure channel. A dead track latch for the channel, settable by the dead track definition signal, provides the error signal until reset.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A record reading system of the binary erasure channel type in which data bits, forming a data byte, are presented on separate tracks in parallel but more or less out of synchronism at the reading level and are separately assembled in a multi-track multi-bit electronic deskewing mechanism as a byte for further processing by circuits which may include error correction mechanism, characterized by provision, for each track, in addition to the normal data flow path and variable frequency clock, of dead track mechanism comprising:

(a) "subminimal signal identification" means, connected to the signal source for the track at the reading level, to scan the data bit signal presentation and respond to a subminimal quality of signal envelope with a (subminimal signal identification) signal;

(b) "dead track error signal producing" means settable by the (subminimal signal identification) signal, to provide to the electronic deskewing mechanism and any error correction mechanism a continuous (error) signal when set; and (c) "dead track definition" means connecting said "subminimal signal identification" means (a) to said "dead track error signal producing" means (b), for determining the reset of said "dead track signal producing" means (b) to end said continuous (error) signal.

2. A multi-channel record reading system comprising:

(a) means to read serially presented multi-bit bytes from a multi-track recording medium;

(b) means to assemble the respective bits of a byte in spite of skew in presentation;

(c) means to correct one or more error bits within a byte;

(d) means for each channel connected to said means to read (a) to identify as a defect envelope for the channel the occurrence of a subminimal series of bit signals presented by the track; and (e) means for each channel responsive to the said means to identify (e) to provide a continuous (error) signal for the channel to said means to assemble (b) and to said means to correct (c).

3. A multi-channel record reading system comprising:

(a) means to read serially presented multi-bit bytes from a multi-track recording medium;

(b) means to assemble the respective bits of a byte in spite of skew in presentation;

(c) means to correct one or more error bits within a byte;

(d) means for each channel to identify as a defect envelope the occurrence of a subminimal series of bit signals presented by each track of the recording medium;

(e) means for each channel connected to said means to identify (e) to define a dead track by subjecting the output of said means to identify (e) to a standard threshold of time delay; and (f) means for each channel connected to said means to define (f) to provide a semipermanent (error) signal for the channel to said means to assemble (b) and to said means to correct (c).

4. A multi-channel record reading system according to claim 3, wherein said means to identify (f) includes minor holdover time delay means providing a temporary (error) signal to said means to correct (c) during the identification period of a signal defect of duration less than the standard threshold of time delay.

5. A record reading system of the binary erasure channel type in which data bits forming a data byte are presented on separate tracks in parallel but more or less out of synchronism at the reading level and are separately assembled in a multi-track multi-bit electronic deskewing mechanism as a byte for further processing by circuits which may include error correction mechanism, characterized by provision, for each track, in addition to the normal data flow path and variable frequency clock, of dead track mechanism comprising:

(a) "subminimal signal identification" means, connected to the signal source for the track at the reading level, to scan the data bit signal presentation and respond to a subminimal quality of signal envelope with a (subminimal signal identification) signal;

(b) "dead track error signal producing" means settable by the (subminimal signal identification) signal, to provide to the electronic deskewing mechanism and any error correction mechanism a continuous (error) signal when set; and (c) "dead track definition" means connecting said "subminimal signal identification" means (a) to said "dead track error signal producing" means (b), further characterized in that (d) said "dead track definition" means (c) includes an AND circuit jointly conditionable by the (subminimal signal identification) signal from said "subminimal signal identification" means (a) and the signal (record gate) identifying the current existence of a unit of data, (e) and said "dead track error signal producing" means (b) includes a (dead track) latch settable by said AND circuit and resettable by the signal (end of record reset) identifying termination of the unit of data.

6. A record reading system of the binary erasure channel type in which data bits forming a data byte are presented on separate tracks in parallel but more or less out of synchronism at the reading level and are separately assembled in a multi-track multi-bit electronic deskewing mechanism as a byte for further processing by circuits which may include error correction mechanism, characterized by provision, for each track, in addition to the normal data flow path and variable frequency clock, of dead track mechanism comprising:

(a) "subminimal signal identification" means, connected to the signal source for the track at the reading level, to scan the data bit signal presentation and respond to a subminimal quality of signal envelope with a (subminimal signal identification) signal;

(b) "dead track error signal producing" means settable by the (subminimal signal identification) signal, to provide to the electronic deskewing mechanism and any error correction mechanism a continuous (error) signal when set, and (c) "dead track definition" means connecting said "subminimal signal identification" means (a) to said "dead track error signal producing" means (b), further characterized in that (d) said "dead track definition" means (c) includes holdover time delay means conditionable by the (subminimal signal identification) signal to provide the (dead track definition) signal only when the time duration of the subminimal signal exceeds the threshold which said holdover time delay means provides.

7. A record reading system of the binary erasure channel type in which data bits forming a data byte are presented on separate tracks in parallel but more or less out of synchronism at the reading level and are separately assembled in a multi-track multi-bit electronic deskewing mechanism as a byte for further processing by circuits which may include error correction mechanism, characterized by provision, for each track, in addition to the normal data flow path and variable frequency clock, of dead track mechanism comprising:

(a) "subminimal signal identification" means, connected to the signal source for the track at the reading level, to scan the data bit signal presentation and respond to a subminimal quality of signal envelope with a (subminimal signal identification) signal;

(b) "dead track error signal producing" means settable by the (subminimal signal identification) signal, to provide to the electronic deskewing mechanism and any error correction mechanism a continuous (error) signal when set; and (c) "dead track definition" means connecting said "subminimal signal identification" means (a) to said "dead track error signal producing" means (b), further characterized in that (d) said "dead track definition" means (c) comprises:

(d–1) gating means jointly conditionable by the (subminimal signal identification) signal from said "subminimal signal identification" means and the signal (record gate) identifying the current existence of a unit of data;

(d–2) minor holdover time delay means connected to said gating means to provide an error signal for the duration of the existence plus a standard duration of postexistence of the (subminimal signal identification) signal; and (d–3) major holdover time delay means connected to said gating means to provide the (dead track definition) signal only when the time duration of the subminimal signal exceeds the threshold which such holdover time delay means provides.

References Cited by the Examiner

UNITED STATES PATENTS 3,156,893 11/1964 Harel ............. 340—146.1

ROBERT C. BAILEY, *Primary Examiner.*

M. LISS, *Assistant Examiner.*